Aug. 7, 1956

W. S. HITCHINS

2,758,293

SYSTEM FOR TIMING TRAFFIC IN TWO
DIRECTIONS ON THE SAME STREET

Filed Feb. 10, 1954

INVENTOR
William Stanton Hitchins.
BY
ATTORNEYS.

Aug. 7, 1956   W. S. HITCHINS   2,758,293
SYSTEM FOR TIMING TRAFFIC IN TWO
DIRECTIONS ON THE SAME STREET
Filed Feb. 10, 1954   9 Sheets-Sheet 6

INVENTOR
*William Stanton Hitchins.*
BY
ATTORNEYS.

Aug. 7, 1956

W. S. HITCHINS

2,758,293

SYSTEM FOR TIMING TRAFFIC IN TWO
DIRECTIONS ON THE SAME STREET

Filed Feb. 10, 1954

INVENTOR
William Stanton Hitchins.
BY
ATTORNEYS.

United States Patent Office 2,758,293
Patented Aug. 7, 1956

2,758,293

SYSTEM FOR TIMING TRAFFIC IN TWO DIRECTIONS ON THE SAME STREET

William S. Hitchins, Lock Haven, Pa.

Application February 10, 1954, Serial No. 409,496

1 Claim. (Cl. 340—40)

The present invention relates to the timing of traffic lights on a two-way street in which traffic is moving in opposite directions at different time intervals.

The present application is a continuation in part of my copending application Serial No. 193,105, now abandoned, filed October 31, 1950, for System for Timing Traffic in Two Directions on the Same Street.

Figure 1:
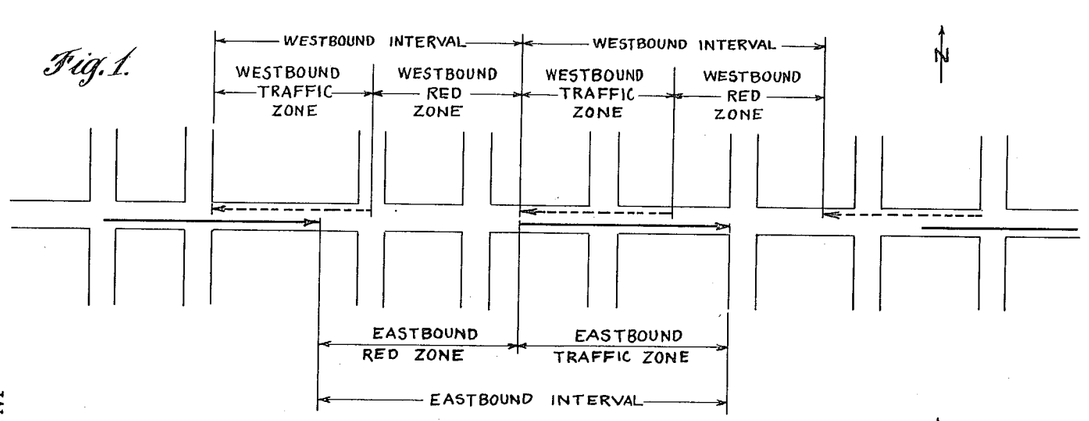
Figure 1 is a graphic illustration of the terms used and particularly of the eastbound and westbound interval, traffic zone and red zone.

When reference is made herein to interval, it will be seen by reference to Figure 1 that it may be defined as the distance between the leading car in one group of cars and the leading car in the next group of cars of traffic moving in a single direction and assuming a saturation of traffic.

A purpose of the invention is to obtain maximum efficiency in timing of traffic lights so as to move traffic with a minimum delay and eliminate the trial and error methods of timing traffic lights.

A further purpose is to obtain a combination of maximum traffic movement in opposite directions on the street with the maximum cross traffic movement which is consistent with the traffic movement on the main street.

A further purpose is to provide a sound basis for computation of the time of change of each phase of traffic light operation at a particular intersection which is consistent with an over-all system of maximum traffic flow in the two directions on the street, while permitting operation in the two directions at standard speeds which may be different, with non-uniform block lengths, with any desired length of street, and with different lengths of traffic intervals in the two directions.

A further purpose is to maintain each traffic light on a two-way street having traffic moving at different intervals in the two opposite directions but the same interval throughout each direction, green as long as a traffic zone is passing the intersection in either direction and red whenever a red zone is passing the intersection in both directions. (It is obvious that cross traffic cannot move if traffic is moving in either direction on the street in question and at the intersection in question.)

A further purpose is to determine the time interval for traffic on the street in each direction as the distance interval in miles multiplied by 3600 divided by the standard speed in miles per hour.

A further purpose is to set every traffic light on the street at the same cycle length which corresponds with the least common denominator of the time intervals of traffic on the street in the two opposite directions.

A further purpose is to interrelate for each intersection the fraction of time devoted to cross traffic and the fraction of the interval devoted to the red zone in each direction by making the product of the fractions of the time intervals devoted to the red zone in each direction equal to the fraction of time devoted to cross traffic.

A further purpose is to determine for each intersection and for both directions the time of arrival of the traffic at each specific intersection from a base point for traffic traveling at the standard speed in either direction, the traffic having departed from the respective basic points simultaneously, by multiplying the distance from the base points in miles by 3600 and dividing by the standard speed in miles per hour.

A further purpose is to determine for each intersection and for each direction the time of commencement of the basic green period after the zero time of the cycle at each intersection for traffic in either direction by multiplying an integer times the cycle length and subtracting from the time of arrival for the respective directions, choosing a value for the integer which gives a product between zero and the cycle length.

A further purpose is to find the time in seconds that each light is red for traffic in each direction by multiplying the fraction of the interval devoted to the red zone for each direction at that intersection by the time interval for the respective directions.

A further purpose is to determine the time in seconds that each light is green for traffic in each direction by subtracting the time in seconds that the light is red for traffic in the particular direction from the time interval for the respective directions.

A further purpose is to find the timing of the commencement of the successive red and green periods of the cycle of each light for each direction by adding or subtracting, as the case may be, the successive times that the light is red or green in the particular direction from the time of commencement of the basic green period after the zero time of the cycle for the same direction until the beginning and end of the cycle are reached.

A further purpose is to compare for each light the times of commencement of the respective green and red periods for that intersection for traffic in the two opposite directions on the street and to set the light at green whenever a traffic zone is passing the intersection on the street in either direction and set the light at red whenever a red zone is passing the intersection in both directions.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

The drawings in each case show diagrams useful in explaining the invention.

Figures 12 to 15 are illustrative of one form of mechanism which may be employed in carrying out the process of the invention.

The invention is designed to permit precise determination of the changes of a particular traffic light in order to permit a two-way street to operate with maximum efficiency by using different time intervals of traffic in the two directions on the street.

In accordance with the invention, the traffic lights are set for green on the street whenever a traffic zone is passing on the street in either of the two opposite directions but are set for red whenever a red zone is passing in both opposing directions.

As will be explained in more detail, the invention contemplates calculating data for each side of the street and then combining this basic data to determine the time-setting of the lights. The traffic lights themselves may be of any of the usually used types having initially adjustable time settings and capable of synchronization of cycle commencement at each intersection with the other intersections on the same street.

For the purpose of the calculation given below, the following information is given: The interval desired in each direction, the standard speed in each direction, the distance of each intersection from the base point for each direction, and the relative importance of traffic in all directions.

The time interval for traffic in each direction is calculated from the interval for that direction expressed in miles multiplied by 3600 and divided by the standard speed in miles per hour for traffic in that direction.

The cycle length which is identical for every light on the street is determined as the least common denominator of the time intervals for traffic in the two opposite directions on the street.

The fraction of time devoted to cross traffic for each intersection equals the product of the fraction of the time interval devoted to the red zone for traffic in one direction at that intersection and the fraction of the time interval devoted to the red zone for traffic in the opposite direction at that intersection.

The time in seconds for arrival of traffic at each specific intersection from the base point, having departed from the respective base points simultaneously, for the respective directions traveling at the standard speed for traffic in that direction is determined as the distance from the base point for that direction in miles times 3600 divided by the speed in miles per hour.

The time of commencement of the basic green period after zero time in the cycle for each intersection for traffic in each direction is determined as the time of arrival for traffic in that direction minus the product of an integer times the length of the cycle in seconds where the integer is chosen to give a value for the time of commencement between zero and the cycle length.

The time in seconds for each light to be red for traffic in each direction is found as the fraction of the interval devoted to the red zone for that direction multiplied by the time interval in seconds for that direction.

The time in seconds for the light to be green for each intersection and each direction is found as the difference between the time interval for the direction in seconds and the time in seconds for the light to be red for the respective direction and intersection.

The timing of the successive changes of each light to green and red for a single direction is found by adding or subtracting, as the case may be, the time in seconds for that light to be red or green to the time of commencement of the basic green period after the zero time of the cycle until the result produces values to the limits of the cycle.

For each intersection the times for changing of the light to green and red for traffic in each direction are compared, and the light is set for green on the street whenever a traffic zone in either direction on the street is passing the intersection, and is set for red whenever a red zone in both directions on the street is passing the intersection.

It will be evident, of course, that any preferred practice regarding the employment of a caution light to warn of the change from green to red will be employed in connection with the present system.

Having computed these data, each traffic light must be adjusted to conform to the cycle computed for the intersection where the light is located and synchronized so that each light passes through the zero cycle time at the same instant, and operates so that the zero times coincide with each complete cycle operation.

In this discussion, for the sake of clarity, the street under discussion will be assumed to be an east-west street, and the cross streets north-south streets.

In the drawing, because of the small size of the circles indicating traffic lights, the cross hatching usually employed to denote colors is not used, but instead a solid circle denotes red and an open circle denotes green on the east-west street. Eastbound traffic is indicated by solid arrows and westbound traffic is indicated by dotted arrows.

By referring to Figure 1, it will be seen what is meant hereinafter by the terms interval, red zone, and traffic zone. It is pointed out that in timed traffic light systems an interval is the distance between the leading car in one group of cars to the leading car in the next group of cars assuming a saturation of traffic and considering traffic in a single direction.

To understand the description and drawings, the eastbound traffic must be separately considered from the westbound traffic as though they were two separate one-way streets placed side by side, each one-way street having its own traffic lights. It follows that there could be cross traffic only when the traffic lights in both east and westbound directions are red. In the drawings, therefore, a green light indicates an intersection where cross traffic is not possible because of traffic on the east-west street, and a red light indicates that cross traffic is possible at the intersection in question.

Timed traffic in two directions on the same street must result in zones of traffic moving eastward at uniform speeds, and zones of traffic moving westward at uniform speeds. In addition, each cross street must have an opportunity to move its cross traffic. The speeds of traffic on opposite sides of the street need not be the same, but ordinarily it is considered desirable to have them the same. The interval, see Figure 1, between zones on one side need not be uniform, or if uniform, need not be the same as that on the other side of the street. (In this system interval is uniform on each side of the street but is not the same on the two sides of the street.)

Figure 3:
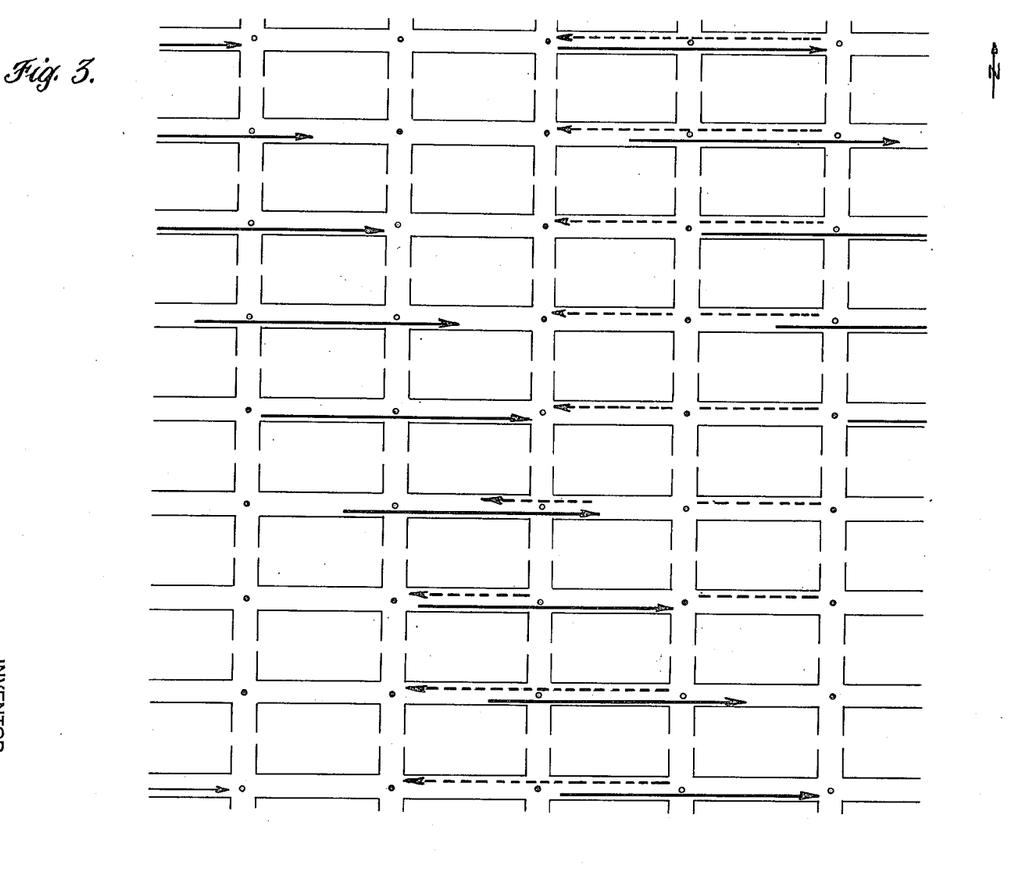
Figure 3 illustrates the progress of traffic at eight equal intervals on a two-way street when the traffic lights are set as if the operation were one way eastbound, the figure showing the effect on westbound traffic and cross traffic.

If the lights on the eastbound side of the street are timed in the same manner as a one-way street is timed, and the lights for the westbound side are synchronized so that at each interesction the light for the westbound traffic is the same as the light for the eastbound traffic, the eastbound traffic moves smoothly with only incidental slowdowns. (See Figure 3.)

This system is sometimes used to speed traffic out of town at night, or into town in the morning. Unfortunately, westbound traffic is stopped part of the time, and the more traffic moved on the eastbound side, the less traffic is moved on the westbound side. Cross traffic has equal opportunity at each intersection.

Figure 4:
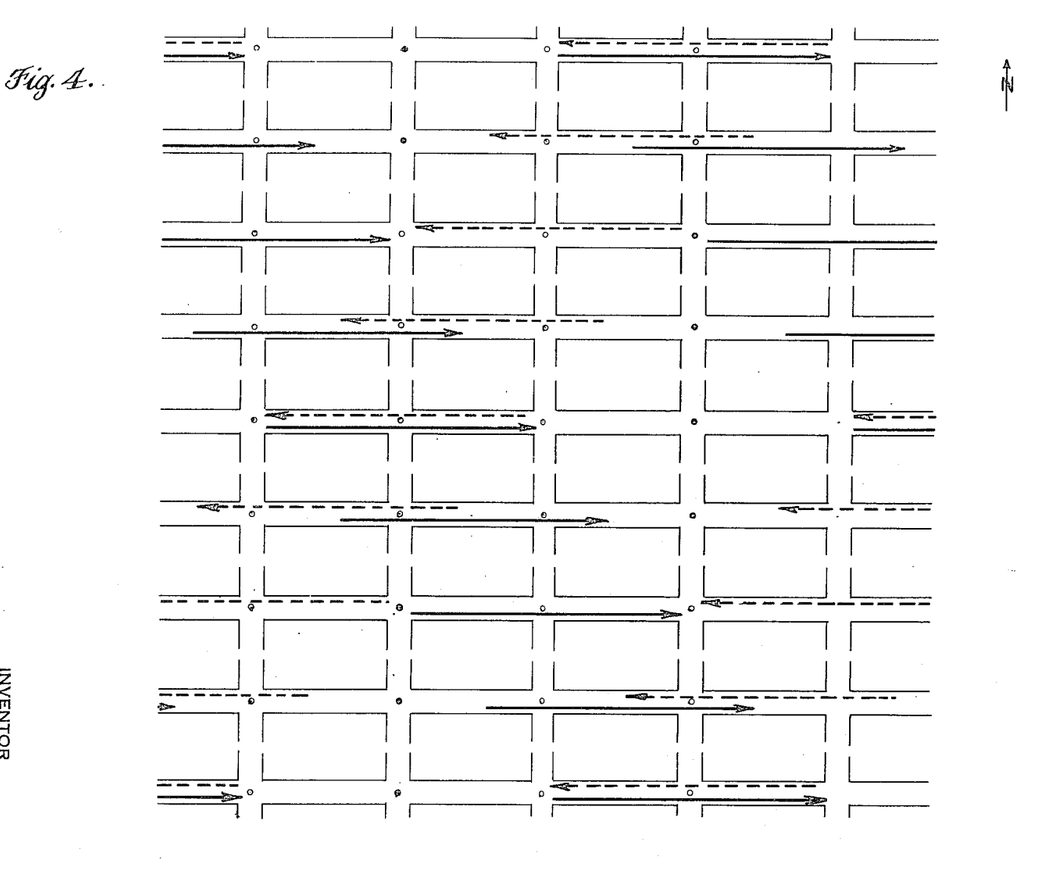
Figure 4 shows the progress of traffic at eight equal intervals on a two-way street where the traffic lights are timed as if the street were constituted as a one-way street eastbound and a one-way street westbound set side by side with the same intervals for eastbound and westbound traffic, showing the effect on cross traffic periods between various cross streets.
Figure 5:
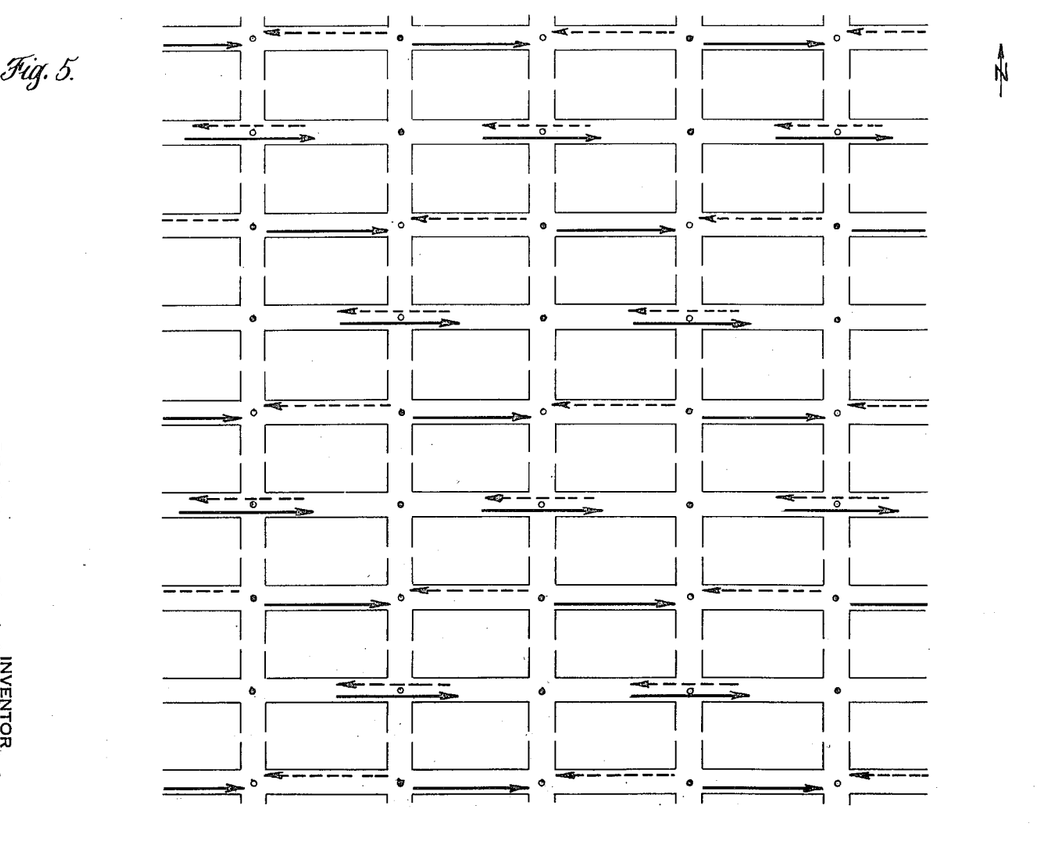
Figure 5 is a view similar to Figure 4 with traffic lights timed in the same manner, showing a special arrangement in which each cross street has an equal opportunity to move traffic.

If the eastbound traffic is timed as a one-way eastbound street, and the westbound traffic is timed as a one-way westbound street, with the eastbound interval equal to the westbound interval, the distribution of cross traffic time is unequal beween cross streets, and this does not lend itself to ready adjustment. In Figure 4 it can be seen from the four cross streets on which traffic lights are indicated that two of the cross streets have no cross traffic time while the other two have fifty percent cross traffic time. A satisfactory timing in two directions with identical interval on both sides can be accomplished under certain special circumstances. One example of this is shown in Figure 5 where the interval is two blocks, the traffic zone is the same length as the red zone, and the length of the blocks is uniform. This is not a satisfactory system for general use because of the extremely short interval and it usually cannot be used because, in most localities, the length of blocks is not uniform.

Figure 2:
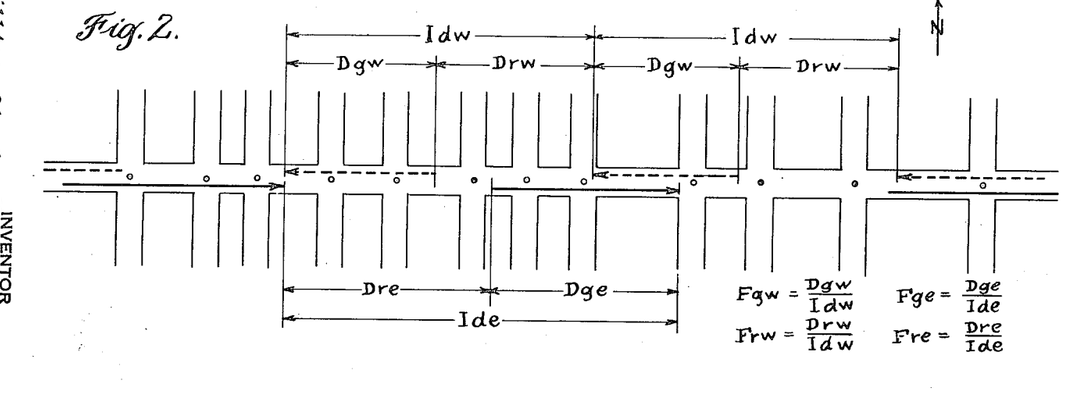
Figure 2 is a view similar to Figure 1, showing the symbols applied to an illustration to explain their meaning.

In the system of the invention, zones of traffic move in both directions, but the eastbound interval (uniform throughout the length of the street) is not equal to the westbound interval (also uniform) as shown in Figures 1 and 2. These traffic zones move eastward and westward and the lights are so timed that whenever a traffic zone from either direction is passing an intersection the light is green in the east-west direction. When both the eastbound red zone and the westbound red zone are crossing the intersection, the light changes to allow cross traffic. By a calculation beyond the scope of this description, it can be shown that over a period of time the cross traffic times of any two points of the street will be equal or very nearly so (barring deliberate adjustment to make cross traffic times vary at specific intersections).

In the selection of the factors $F_c$, $F_{re}$, and $F_{rw}$, the factors which control the distribution of traffic movement in the several directions are:

The amount of traffic moved is proportional to the speed of movement, to the fraction of time traffic passes a given point and to the number of lanes of traffic. For instance on a one-lane, one-way highway having no intersections, with traffic moving at 30 miles per hour, 30 miles of traffic space would pass a given point in one hour.

With two lanes, 60 miles of traffic space would pass.

With two lanes and the traffic stopped one-half of the time to permit cross traffic 30 miles of traffic space would pass. Therefore, miles of traffic space per hour is:

$$TS = L(1-Fr)S$$

where:

TS is traffic space per hour and L is the number of lanes of traffic for that direction.

$Fr$ is the fraction of the interval devoted to the red zone.

$e$ is the subscript which may be added to any other symbol to indicate the eastbound direction.

$w$ is the same as $e$ except that it indicates westbound direction.

$c$ is the same as $e$ except that it indicates cross traffic direction.

It is obvious that if the two sides of a street have traffic moving at the same time interval, that the successive traffic periods of the intersection (considering movement in both directions) will be the same each successive time, i. e. the least common denominator of two identical numbers is the same number and the cycle time will equal the interval time in seconds.

In order to have equal opportunity for cross traffic at every intersection with unequal block lengths, the interval times must differ. (See Figure 4.)

With differing intervals, the red period in one direction falls at a different time in relation to the red period in the other direction for each successive arriving red period until the end of the cycle is reached.

Now if the $F_{rw}=\frac{1}{3}$, one third of the total time is available for cross traffic as far as westbound traffic is concerned. However, if $F_{re}=\frac{1}{3}$, and the intervals are different on the eastbound and westbound side, as the eastbound red periods fall at random, one-third of the time the westbound red zone is passing the intersection will also have an eastbound red zone passing. As the cross traffic period occurs only when both red zones are passing the fraction of time devoted to cross traffic is equal to the product of $F_{re}$ and $F_{rw}$.

To combine these factors to distribute traffic movement in the several directions $$TS_e = L_e(1-F_{re})S_e$$
$$TS_w = L_w(1-F_{rw})S_w$$
$$TS_c = L_c(1-F_c)S_c$$
$$F_c = F_{re} \times F_{rw}$$

Assume each direction has two lane traffic, that cross traffic is to have one-half the time and that eastbound traffic is twice as heavy as westbound with the eastbound speed 20 miles per hour and westbound speed 15 miles per hour $$F_c = F_{re} \times F_{rw}$$
$$\tfrac{1}{2} = F_{re} \times F_{rw}$$
$$F_{rw} = \frac{1}{2F_{re}}$$
$$TS_e = 2TS_w$$
$$L_e(1-F_{re})S_e = 2L_w(1-F_{rw})S_w$$
$$2(1-F_{re})20 = 2 \times 2\left(1 - \frac{1}{2F_{re}}\right)15$$
$$40 - 40F_{re} = 60 - \frac{60}{2F_{re}}$$
$$40 - 40F_{re} = 60 - \frac{30}{F_{re}}$$
$$40F_{re} - 40F_{re}^2 = 60F_{re} - 30$$
$$0 = 40F_{re}^2 + 20F_{re} - 30$$
$$0 = 4F_{re}^2 + 2F_{re} - 3$$

$$\frac{13}{4} = 4Fre^2 + 2Fre + \tfrac{1}{4}$$

$$\frac{13}{4} = (2Fre + \tfrac{1}{2})^2$$

$$\sqrt{\frac{13}{4}} = 2Fre + \tfrac{1}{2}$$

$$\tfrac{1}{2}\sqrt{13} = 2Fre + \tfrac{1}{2}$$

$$\tfrac{1}{2} \times 3.6 = 2Fre + \tfrac{1}{2}$$

$$1.8 - \tfrac{1}{2} = 2Fre$$

$$1.3 = 2Fre$$

$$Fre = .65$$

$$Frw = \frac{1}{2Fre}$$

$$Frw = \frac{1}{2 \times .65} = .769$$

Figure 6:
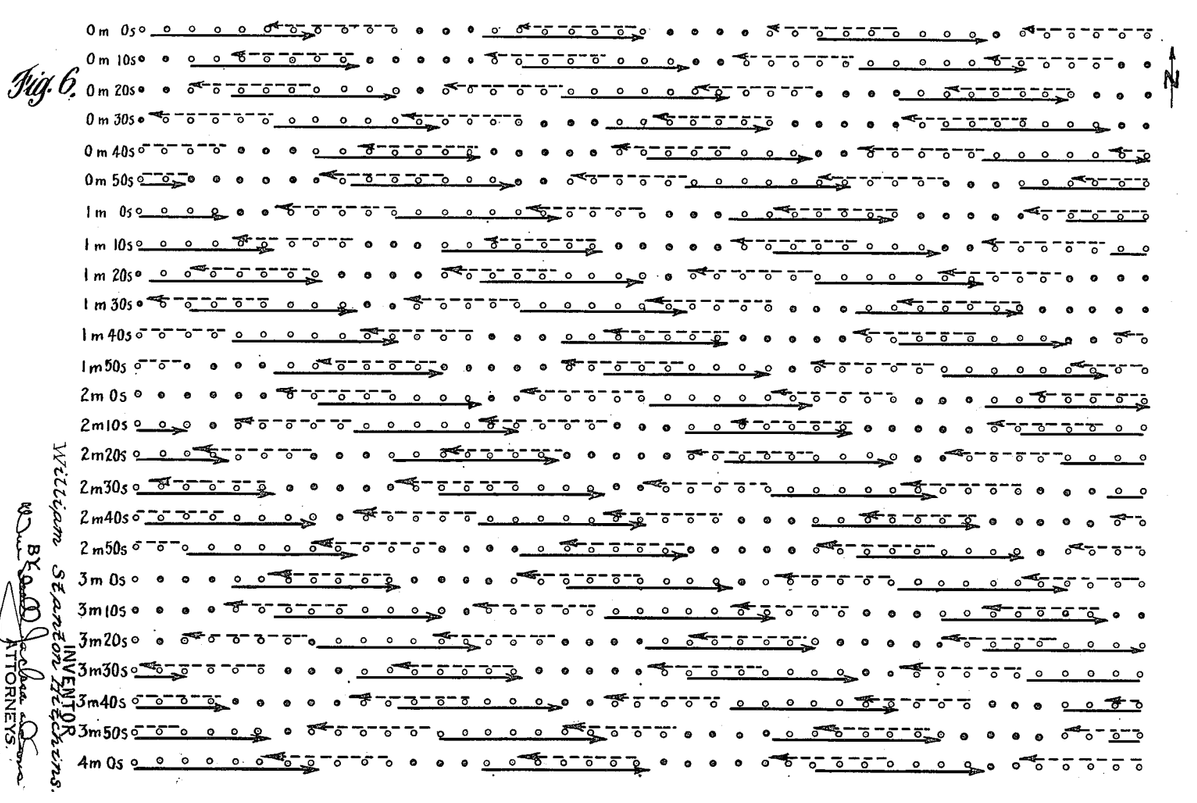
Figure 6 shows a complete cycle of operation in a system according to the present invention and illustrates the condition of traffic lights from one end to the other end of a street whose traffic lights are timed in accordance with the invention, observed at ten second intervals throughout one complete cycle. The data for Figure 6 is the same as that for Example I in the calculations. The timing of any particular traffic light operating in a system using the same basic data can be found from one of the cycles shown on Figure 6 provided that the zero time may not be the same. From observation of Figure 6 it can be seen that any cycle has approximately the same time for cross traffic.

Figure 6 illustrates the traffic light picture on a street at ten second intervals for twenty-five successive times. Note that the picture for 0 minutes, 0 seconds is the same as the picture for 4 minutes, 0 seconds, and therefore the sketch shows a complete cycle of operation.

The following data were used for Figure 6:

Length of street shown______________________miles__ 2
Interval eastbound__________________________do____ ⅔
Interval westbound__________________________do____ ½
Speed __________________________________M. P. H__ 30
Traffic lights at every cross street, distance between lights ____________________________________ 1/20
Traffic zone is the same length as red zone in each direction.

To calculate the cycle for any specific traffic light of a series the following data must be selected:

a. Fraction of time to be allowed for cross traffic at the intersection in question. This need not be the same at any two intersections, but this fraction should be selected according to the importance of cross traffic at that intersection.
b. Speed of traffic. If desired, this may be different on the two sides of the street.
c. Interval for each side. The intervals expressed in seconds must be different for the two sides of the street.
  It is advisable to select intervals with a low common denominator to reduce cycle time. It is recommended that the interval on one side of the street, expressed in seconds, be equal to one and one-third of the other interval expressed in seconds.
d. Minimum cross traffic period, and action to be taken when a shorter traffic period occurs. This factor is required for cases in which a cross traffic time, say one second for instance, is too short for enough traffic to flow to make the light change worthwhile. It is therefore necessary to select an acceptable minimum.
e. The base points from which the lighting sequence is calculated. These would ordinarily be the extremities of the section to be timed.
f. The comparative relative importance of traffic in the eastbound direction to the importance of traffic in the westbound direction.
g. Length of caution light.

The following symbols are used in the calculation (Figure 2 shows the various symbols):

$e$—Subscript which may be added to any other symbol to indicate the eastbound direction.
$w$—same as "$e$" except indicates westbound direction.
$c$—Same as "$e$" except indicates cross traffic direction.
$Id$—Interval expressed in miles.
$Is$—Interval expressed in seconds.
$S$—Speed in miles per hour.
$Ta$—Time in seconds to arrive at a specific intersection from the base point traveling at the selected speed.
$TS$—Traffic space available in miles per hour.
$D$—Distance in miles from a base point.
$L$—Number of lanes of traffic in use.
$Fg$—Fraction of interval devoted to traffic zone (Figure 2).
$Fr$—Fraction of interval devoted to red zone (Figure 2).
$Tg$—Time in seconds light is to be green for one direction of traffic.
$Tr$—Time in seconds light is to be red for one direction of traffic.
$Fc$—Fraction of time allowed for cross traffic in one complete cycle.
$n$—Any whole number.
$C$—Time in seconds for a complete cycle.
$T0, T2, T4$, etc.—Time for green period to commence if after reference time.
$2T, 4T, 6T$, etc.—Time for green period to commence, if before reference time.
$T1, T3, T5, T7$, etc.—Time for red period to commence, if after reference time.
$1T, 3T, 5T$, etc.—Time for red period to commence if before reference time.
$Dg$—Length of traffic zone in miles.
$Dr$—Length of red zone in miles.

The interval in seconds is:

$$Is = \frac{Id \times 3600}{S}$$

The length in seconds of the cycle is:

$C$ = Lowest common denominator of $Ise$ and $Isw$

The time in seconds of arrival at the specific intersection traveling from the base point at the standard speed is:

$$Ta = \frac{D \times 3600}{S}$$

The fraction of the interval devoted to the traffic zone and red zone is:

$$Fr = \frac{Dr}{Id}, \quad Fg = \frac{Dg}{Id}$$

The fraction of time devoted to cross traffic in one complete cycle is:

$$Fc = Fre \times Frw$$

The time in seconds the light is to be red for one direction of traffic is:

$$Tr = Fr \times Is$$

The time in seconds the light is to be green for one direction of traffic is:

$$Tg = Is - Tr$$

The time of starting of the basic green period after zero time of the cycle is:

$T0 = Ta - (n \times C)$ where $n$ is selected to have a value that makes $T0 < C$ and $T0 > 0$.

The time of start of the next red period is:

$$T1 = T0 + Tg$$

The time of start of the next green period is:

$$T2 = T1 + Tr$$

The time of start of the next red period is:

$$T3 = T2 + Tg$$

The time of start of the next green period is:

$$T4 = T3 + Tr \text{ etc.}$$

until a value greater than $C$ is reached.

The time of start of the red period preceding the reference time is:

$$1T = T0 - Tr$$

The time of start of the next preceding green period is:

$$2T = 1T - Tg$$

The time of start of the next preceding red period is:

$$3T = 2T - Tr$$

The time of start of the next preceding green period is:

$$4T = 3T - Tg \text{ etc.}$$

until a minus value is reached.

EXAMPLE I

Figure 7:
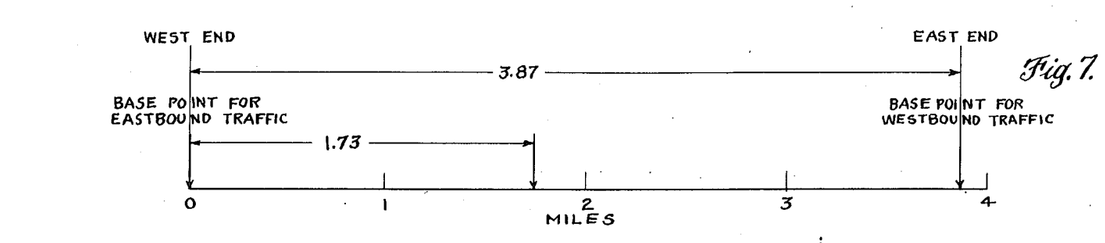
Figure 7 is a diagram showing the relationship of the distances between the ends of the street, the base points and the location of the intersection under consideration, for Example I of the calculations.

Example of calculations for one of a series of traffic lights, the light being 1.73 miles from the west end of an east-west street 3.87 miles long (Figure 7).

a. Fraction of time for cross traffic, $Fc = \frac{1}{4}$
b. Speed of traffic, $S = 30$ M. P. H.
c. Interval westbound, $Idw = \frac{1}{2}$ mile
   Interval eastbound, $Ide = \frac{2}{3}$ mile
d. Minimum cross traffic period, 10 seconds. Calculated periods less than 5 seconds will be dropped.
e. Base points for calculation. Extremities of street.
f. Traffic of same importance in each direction.
g. Length of caution light 6 seconds.

*Calculation of cycle*

$$Isw = \frac{Idw \times 3600}{S} = \frac{\frac{1}{2} \times 3600}{30} = 60 \text{ sec.}$$

$$Ise = \frac{Ide \times 3600}{S} = \frac{2}{3} \times \frac{3600}{30} = 80 \text{ sec.}$$

$C =$ Lowest common denominator of 80 and 60 $= 240$ sec.
Calculation of fraction of interval devoted to red zone:

$$Fc = Fre \times Frw = \frac{1}{4}$$

Traffic is of equal importance in both directions so $$Fre = Frw$$
$$Fc = Frw^2 = \frac{1}{4}$$
$$Frw = \frac{1}{2} = Fre$$

*Calculation for westbound traffic*

$$Taw = \frac{D \times 3600}{S} = \frac{(3.87 - 1.73) \times 3600}{30} = 256.8 \text{ sec.}$$

$$T0w = Taw - (n \times C) = 256.8 - (1 \times 240) = 16.8 \text{ sec.}$$

when $$T0w < C = 240$$
$$T0w > 0$$

Time in seconds the light is red and green:

$$Trw = Frw \times Isw = \frac{1}{2} \times 60 = 30 \text{ sec.}$$
$$Tgw = Isw - Trw = 30 \text{ sec.}$$

Time of various light changes:

$T1w = T0w + Tgw = 16.8 + 30 = 46.8$ (to red)
$T2w = T1w + Trw = 46.8 + 30 = 76.8$ (to green)
$T3w = T2w + Tgw = 76.8 + 30 = 106.8$ (to red)
$T4w = T3w + Trw = 106.8 + 30 = 136.8$ (to green)
$T5w = T4w + Tgw = 136.8 + 30 = 166.8$ (to red)
$T6w = T5w + Trw = 166.8 + 30 = 196.8$ (to green)
$T7w = T6w + Tgw = 196.8 + 30 = 226.8$ (to red)
$T8w = T7w + Trw = 226.8 + 30 = 256.8 > 240 = C$ (to green)
$1Tw = T0w - Trw = 16.8 - 30 = -13.2 < 0$ (to red)

*Calculation for eastbound traffic*

$$Tae = \frac{D \times 3600}{S} = \frac{1.73 \times 3600}{30} = 207.6$$

$$T0e = Tae - (n \times C) = 207.6 - (0 \times 240) = 207.6$$

When $$T0e < C = 240$$
$$T0e > 0$$

Time in seconds the light is red and green:

$$Tre = Fre \times Ise = \frac{1}{2} \times 80 = 40 \text{ sec.}$$
$$Tge = Ise - Tre = 80 - 40 = 40 \text{ sec.}$$

Time of various light changes:

$T1e = T0e + Tge = 207.6 + 40 = 247.6 > 240 = C$ (to red)
$1Te = T0e - Tre = 207.6 - 40 = 167.6$ (to red)
$2Te = 1Te - Tge = 167.6 - 40 = 127.6$ (to green)
$3Te = 2Te - Tre = 127.6 - 40 = 87.6$ (to red)
$4Te = 3Te - Tge = 87.6 - 40 = 47.6$ (to green)
$5Te = 4Te - Tre = 47.6 - 40 = 7.6$ (to red)
$6Te = 5Te - Tge = 7.6 - 40 = -32.4 < 0$ (to green)

Inasmuch as cross traffic may flow only when neither eastbound or westbound traffic is passing the intersection, when either an eastbound traffic zone or a westbound traffic zone is passing the intersection, the light indicates green in both eastbound and westbound directions.

Combination of eastbound and westbound traffic times in seconds:

| Green Light | | Red Light | | Time Light Changes | |
|---|---|---|---|---|---|
| Westbound | Eastbound | Westbound | Eastbound | To Green | To Red |
| -------- | -------- | −13.2 | -------- | -------- | -------- |
| -------- | -------- | -------- | 7.6 | -------- | 7.6 |
| 16.8 | -------- | -------- | -------- | 16.8 | -------- |
| -------- | -------- | 46.8 | -------- | -------- | 46.8 |
| -------- | 47.6 | -------- | -------- | 47.6 | -------- |
| 76.8 | -------- | -------- | -------- | -------- | -------- |
| -------- | -------- | -------- | 87.6 | -------- | -------- |
| -------- | -------- | 106.8 | -------- | -------- | 106.8 |
| -------- | 127.6 | -------- | -------- | 127.6 | -------- |
| 136.8 | -------- | -------- | -------- | -------- | -------- |
| -------- | -------- | 166.8 | -------- | -------- | -------- |
| -------- | -------- | -------- | 167.6 | -------- | 167.6 |
| 196.8 | -------- | -------- | -------- | 196.8 | -------- |
| -------- | 207.6 | -------- | -------- | -------- | -------- |
| -------- | -------- | 226.8 | -------- | -------- | -------- |
| -------- | -------- | -------- | 247.6 | -------- | 247.6 |

Note that the red periods starting at 7.6 and 46.8 are less than the minimum cross traffic period.

| | Length of Light in Seconds | |
|---|---|---|
| | Red | Green |
| 0.0 Light is green | | |
| 7.6 Change to red | | |
| 16.8 Change to green | 9.2 | |
| 46.8 Change to red | | 30.0 |
| 47.6 Change to green | 0.8 | |
| 106.8 Change to red | | 59.2 |
| 127.6 Change to green | 20.8 | |
| 167.8 Change to red | | 40.0 |
| 196.8 Change to green | 29.2 | |
| 240.0 Cycle commences repeating | | |
| 247.6 Change to red | | 50.8 |
| Total | 60.0 | 180.0 |

When a red period is less than the minimum cross traffic period but more than a selected fraction of the minimum cross traffic period, the red light period is increased to the minimum cross traffic period. If it is less than the selected fraction of the minimum cross traffic period, the red period is dropped. One-half is recommended as the fraction to be selected. When a cross traffic period is extended to meet minimum cross traffic time, the addition is applied at the beginning of the period leaving the end time unchanged.

Therefore:

The cross traffic period beginning at 7.6 and ending at 16.8 is changed to begin at 6.8.

The cross traffic period beginning at 46.8 is dropped.

Final light cycle

| Time | East-West Light | North-South Light |
|---|---|---|
| 0.0 | Green | Red |
| 0.8 | Yellow | Red |
| 6.8 | Red | Green |
| 10.8 | Red | Yellow |
| 16.8 | Green | Red |
| 100.8 | Yellow | Red |
| 106.8 | Red | Green |
| 121.6 | Red | Yellow |
| 127.6 | Green | Red |
| 161.6 | Yellow | Red |
| 167.6 | Red | Green |
| 190.8 | Red | Yellow |
| 196.8 | Green | Red |
| 240.0 | Cycle commences repeating | |
| 240.8 | Yellow | Red |

Figure 8:
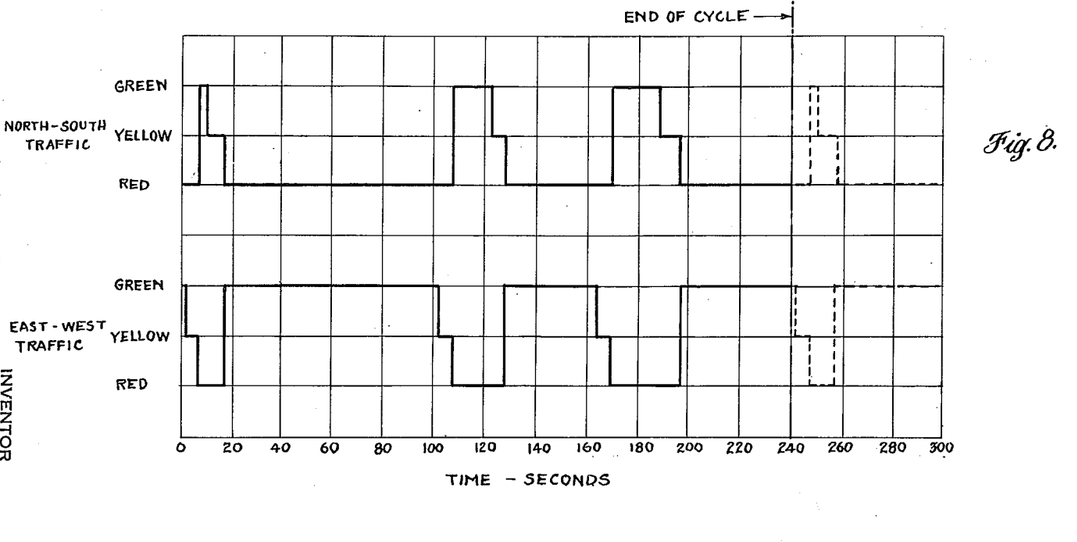
Figure 8 is a diagram showing the condition of the lights and the timing for north-south traffic and east-west traffic throughout a complete cycle at the particular intersection under consideration in Example I. The ordinate is traffic light condition and the abscissa is time.
Figure 8A:
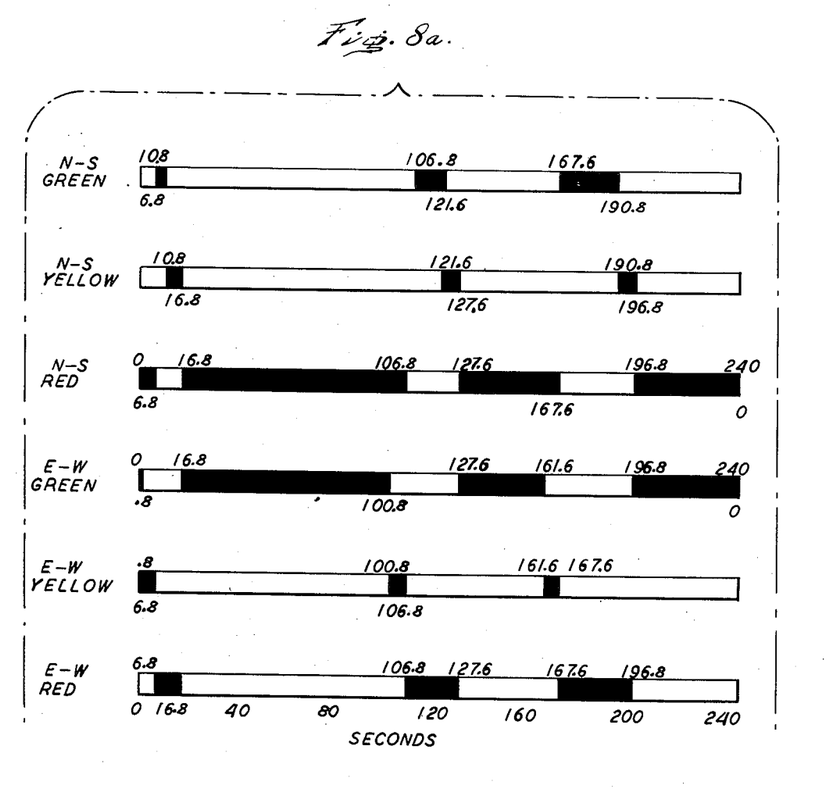
Figure 8a is a developed view of the commutator contacts of the controller for the stop and go lights at a particular intersection in accordance with Figure 8.

The above final cycle of traffic lights is graphically illustrated in Figure 8.

EXAMPLE 2

In the previous example data were used that would be similar to conditions usually desired. Certain possible variations were not included in the example. The next example (Figures 9, 10 and 11) will include the following variations:

a. $Fre$ not equal to $Frw$
b. $Se$ not equal to $Sw$
c. Lights for eastbound traffic occasionally different color from those for westbound traffic to facilitate left turns.
d. $Fge$ is not equal to $Fre$ and $Fgw$ is not equal to $Frw$
e. Base points not at end of street.
f. Traffic in one direction favored over traffic in the other direction.

Figures 9, 10:
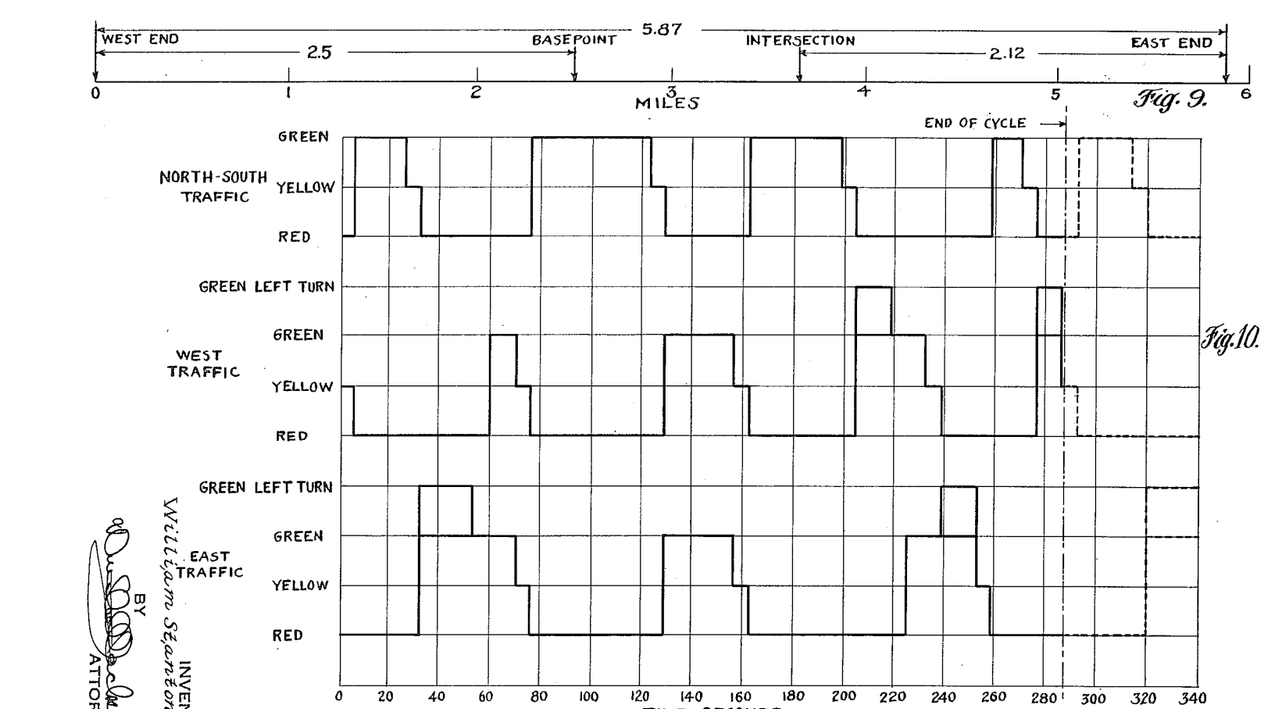
Figure 9 is a diagram similar to Figure 7, showing the relationships of the ends of the street, the base point and the particular intersection under consideration from the standpoint of distance for Example II of the calculations.
Figure 10 is a diagram for Example II, plotting traffic light condition at the particular intersection for north-south traffic, west traffic and east traffic as the ordinate and plotting time for a complete cycle as abscissa.

Conditions for this example a. Fraction of time devoted to cross traffic ($Fc$) ½
b. Speed eastbound ($Se$) 20 M. P. H.
   Speed westbound ($Sw$) 15 M. P. H.
c. Interval miles eastbound ($Ide$) .4 mile
   Interval miles westbound ($Idw$) .3 mile
d. Minimum cross traffic period 10 seconds. If a period of 5 seconds or less occurs, period will be disregarded.
e. Base point for both directions, 2.50 miles from west end of street (Figure 9).
f. Eastbound traffic is of greater importance than westbound traffic.
g. Length of caution light 6 seconds.
h. The intersection to be calculated is on a street 5.87 miles long. The intersection to be calculated is 2.12 miles from the east end of the street (Figure 9).

Calculation of cycle $$Ise = \frac{Ide \times 3600}{Se} = \frac{.4 \times 3600}{20} = 72 \text{ seconds}$$

$$Isw = \frac{Idw \times 3600}{Sw} = \frac{.3 \times 3600}{15} = 72 \text{ seconds}$$

Values of $Ise$, $Isw$, $Se$, and $Sw$ were deliberately selected to illustrate improper selection of these values. As the system will not work with $Ise = Isw$, one or more of the factors $Ide$, $Idw$, $Se$, and $Sw$ must be changed. When $Se$ equals $Sw$ and $Ide$ is not equal to $Idw$, $Ise$ will not be equal to $Isw$.

Assuming that it is desired that $Isw$ equal 72 seconds, and assuming that $Isw$ is to be ¾ $Ise$:

$$Ise = \frac{4}{3}Isw = \frac{Ide \times 3600}{Se} = \frac{Ide \times 3600}{20}$$

$$Ide = \frac{4 \times 20 \times 72}{3 \times 3600} = .533 \text{ miles}$$

$$Ise = \frac{Ide \times 3600}{Se} = \frac{.533 \times 3600}{20} = 96 \text{ seconds}$$

Cycle is lowest common denominator of 72 seconds and 96 seconds.

$$C = 288 \text{ seconds}$$

Calculation of fraction of interval devoted to red zone $$Fc = \frac{1}{2} = Fre \times Frw$$

If     $Fre = .5$    then $Frw = 1.0$
        $Fre = .6$          $Frw = .833$
        $Fre = .7$          $Frw = .714$ As eastbound traffic is to be given emphasis and the smaller $Fr$, so that the larger amount of traffic can move in the eastbound direction, and a reasonable amount of traffic must move westbound, let $Fre$ equal .65.

$$Fre \times Frw = Fc = 1/2$$

$$Frw = \frac{1}{2 \times .65} = .769$$

It is of interest to note that the amount of traffic does not depend on the length of the interval, but rather on the fraction of the interval devoted to the traffic zone, and the speed of the traffic.

For comparison purposes, assuming one lane of traffic in each direction:

Amount of traffic eastbound $= TS$
$$= Fge \times Se \times Le$$
$$= (1 - .65) \times 20 \times 1 = 7.0$$

Amount of traffic westbound
$$= Fgw \times Sw \times Lw$$
$$= (1 - .769) \times 15 \times 1 = 3.465$$

Ratio eastbound to westbound
$$= \frac{7.0}{3.465} = 2.02$$

Therefore there will be more than twice as much timed traffic in the eastbound direction as in the westbound direction.

It will be evident that the above calculation represents a trial and error method of calculating, whereas a more rigid calculation has been presented earlier in this specification.

Calculation for eastbound traffic (Figure 9)

$$Tae = \frac{D \times 3600}{Se} = \frac{(5.87 - 2.12 - 2.50) \times 3600}{20} = 225 \text{ sec.}$$

$T0e = Tae - (n \times C)$ where $T0e < C$ $T0e > 0$
$T0e = 225 - (0 \times 288) = 225$ sec.
$Tre = Fre \times Ise = .65 \times 96 = 62.4$ sec.
$Tge = Ise - Tre = 96 - 62.4 = 33.6$
$T1e = T0e + Tge = 225 + 33.6 = 258.6$ (to red)
$T2e = T1e + Tre = 258.6 + 62.4 = 321 > 288 = C$ (to green)
$1Te = T0e - Tre = 225 - 62.4 = 162.6$ sec. (to red)
$2Te = 1Te - Tge = 162.6 - 33.6 = 129$ sec. (to green)
$3Te = 2Te - Tre = 129 - 62.4 = 66.6$ sec. (to red)
$4Te = 3Te - Tge = 66.6 - 33.6 = 33$ sec. (to green)
$5Te = 4Te - Tre = 33 - 62.4 = -29.4$ sec. $< 0$ (to red)

Calculation for westbound traffic (Figure 9)

Note that distance is negative in this case.

$$Taw = \frac{D \times 3600}{Sw} = \frac{-(5.87 - 2.12 - 2.50) \times 3600}{15} = -300 \text{ sec.}$$

$T0w = Taw - (n \times C)$ where $T0e < C$ $T0e > 0$
     $= -300 - (-2 \times 288) = 276$
$Trw = Isw \times Frw = 72 \times .769 = 55.4$ sec.
$Tgw = Isw - Trw = 72 - 55.4 = 16.6$
$T1w = T0w + Tgw = 276 + 16.6 = 292.6$ sec. $> 288$ sec. $= C$ (to red)
$1Tw = T0w - Trw = 276 - 55.4 = 220.6$ sec. (to red)
$2Tw = 1Tw - Tgw = 220.6 - 16.6 = 204.0$ sec. (to green)

$3Tw = 2Tw - Trw = 204.0 - 55.4 = 148.6$ sec. (to red)
$4Tw = 3Tw - Tgw = 148.6 - 16.6 = 132.0$ sec. (to green)
$5Tw = 4Tw - Trw = 132.0 - 55.4 = 76.6$ sec. (to red)
$6Tw = 5Tw - Tgw = 76.6 - 16.6 = 60.0$ sec. (to green)
$7Tw = 6Tw - Trw = 60.0 - 55.4 = 4.6$ sec. (to red)
$8Tw = 7Tw - Tgw = 4.6 - 16.6 = -12.0$ sec. <0 (to green)

Combination of eastbound and westbound traffic times in seconds:

| Green for— | | Red for— | | Time Light Changes To— | |
|---|---|---|---|---|---|
| Eastbound | Westbound | Eastbound | Westbound | Green | Red |
| -------- | -------- | −29.4 | -------- | -------- | -------- |
| -------- | −12 | -------- | -------- | -------- | -------- |
| -------- | -------- | -------- | 4.6 | -------- | 4.6 |
| 33 | -------- | -------- | -------- | 33 | -------- |
| -------- | 60 | -------- | -------- | -------- | -------- |
| -------- | -------- | 66.6 | -------- | -------- | -------- |
| -------- | -------- | -------- | 76.6 | -------- | 76.6 |
| 129 | -------- | -------- | -------- | 129 | -------- |
| -------- | 132 | -------- | -------- | -------- | -------- |
| -------- | -------- | -------- | 148.6 | -------- | -------- |
| -------- | -------- | 162.6 | -------- | -------- | 162.6 |
| -------- | 204 | -------- | -------- | 204 | -------- |
| -------- | -------- | -------- | 220.6 | -------- | 220.6 |
| 225 | -------- | -------- | -------- | 225 | -------- |
| -------- | -------- | 258.6 | -------- | -------- | 258.6 |
| -------- | 276 | -------- | -------- | 276 | -------- |
| -------- | -------- | -------- | 292.6 | -------- | 292.6 |
| 321 | -------- | -------- | -------- | -------- | -------- |

*Resultant light cycle*

| Time in seconds | Length of Light | |
|---|---|---|
| | Green | Red |
| 00.0 Light is green | | |
| 4.6 Change to red | | |
| 33.0 Change to green | | 28.4 |
| 76.6 Change to red | 43.6 | |
| 129.0 Change to green | | 52.4 |
| 162.6 Change to red | 33.6 | |
| 204.0 Change to green | | 41.4 |
| 220.6 Change to red | 16.6 | |
| 225.0 Change to green | | 4.4 |
| 258.6 Change to red | 33.6 | |
| 276.0 Change to green | | 17.4 |
| 288.00 Cycle commences to repeat | | |
| 292.6 Change to red | 16.6 | |
| Total | 144.0 | 144.0 |

As the red period starting at 220.6 seconds is less than five seconds, this red period is dropped.

In order to provide time for left turns without interfering with cross traffic, times should be selected for eastbound traffic left turns when an eastbound green zone is at the intersection and a westbound red zone is at the intersection. No hard and fast rules can be set down for times to be selected, however, the following should be considered:

a. Periods selected should be not less than the minimum cross traffic time.

b. The left turn period should stop a period of time (equal to the caution period approximately) before a westbound traffic zone arrives at the intersection.

All of these considerations apply equally in both directions. The words "eastbound" and "westbound" were used for clarity only.

Figure 11:
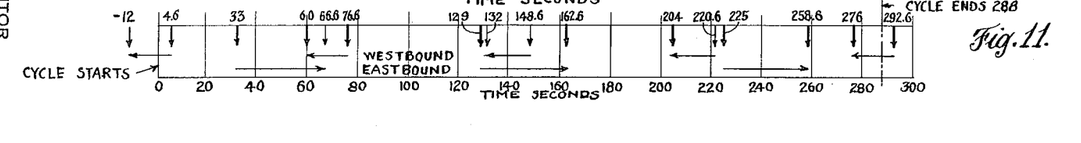
Figure 11 is a time chart for Example II, plotting times of change of the light at the particular intersection with respect to the time of a complete cycle.

The following times have been selected for this example, as will be seen from examination of Figures 10 and 11:

For left turns from eastbound lane:

33.0 to 54.0 sec.
    238.6 to 252.6 sec.

For left turns from westbound lane:

204.0 to 219.0 sec.
    276.0 to 292.6 (4.6) sec.

*Final cycle of traffic light*

| Time | Eastbound | Westbound | North-South |
|---|---|---|---|
| 0.0 | Red | Yellow | Red. |
| 4.6 | Red | Red | Green. |
| 27.0 | Red | Red | Yellow. |
| 33.0 | Green—Left turn | Red | Red. |
| 54.0 | Green | Red | Red. |
| 60.0 | Green | Green | Red. |
| 70.6 | Yellow | Yellow | Red. |
| 76.6 | Red | Red | Green. |
| 123.0 | Red | Red | Yellow. |
| 129.0 | Green | Green | Red. |
| 156.6 | Yellow | Yellow | Red. |
| 162.6 | Red | Red | Green. |
| 198.0 | Red | Red | Yellow. |
| 204.0 | Red | Green—Left turn | Red. |
| 219.0 | Red | Green | Red. |
| 225.0 | Green | Green | Red. |
| 232.6 | Green | Yellow | Red. |
| 238.6 | Green—Left turn | Red | Red. |
| 252.6 | Yellow | Red | Red. |
| 258.6 | Red | Red | Green. |
| 270.0 | Red | Red | Yellow. |
| 276.0 | Red | Green—Left turn | Red. |
| 286.6 | Red | Yellow | Red. |
| 288.0 | Cycle commences repeating | | |
| 292.6 (4.6) | Red | Red | Green. |

The above final cycle of traffic lights is graphically illustrated in Figure 10 including the green left-hand turns.

From the foregoing it will be seen that I have provided a new method of timing a series of traffic lights to provide a simultaneous steady flow of traffic in the two opposite directions on a street under the following conditions:

(a) Different or identical speeds of traffic for eastbound and westbound traffic.

(b) Selected proportions of time allowed for opposing traffic.

(c) Any length of blocks between the intersections considered. (As the traffic light cycle can be computed for any point on the street, it is obvious that varying lengths of blocks is immaterial.)

(d) Any length of street.

Also cross traffic (north-south) may occur for any given proportion of an interval, and there will be adequate time for left-hand turns for both east and westbound traffic at all intersections.

It will be evident that the process of the invention can be carried out entirely by hand, utilizing coordinated watches at each intersection and an individual operator controlling each intersection according to the established program. It can also be carried out by using control cars at the beginning and the end of each traffic zone, which indicate by their arrival at a particular intersection the change in traffic to be made by the officer in control at that intersection.

It is preferred, however, to carry out the processes of the invention by mechanism which will simplify the change in traffic lights. Any accepted timer of character well known in the art which will make a succession of switching changes for a cycle of desired length with predetermination of different time intervals between the successive switching changes can be employed.

One mechanism of this character is illustrated in Figures 12 to 15.

Figure 12:
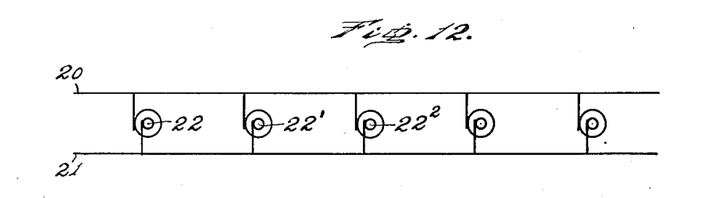
Figure 12 is an electric circuit diagram showing controls at several intersections.

Figure 12 illustrates alternating current electric power leads 20 and 21, which at the various intersections drive synchronous motors 22, 22', 22², etc., each of which is in step, and each of which has the same base time.

Figure 13:
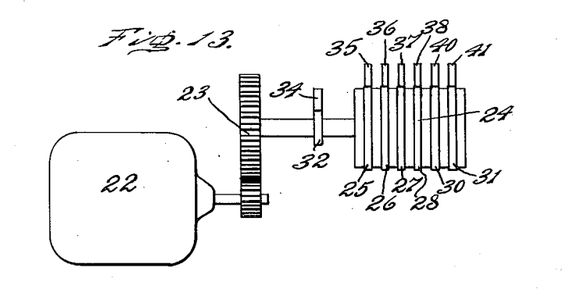
Figure 13 is a diagrammatic side elevation of mechanism useful in applying the invention.
Figure 14:
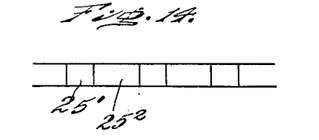
Figure 14 is a fragmentary development of one commutator path of Figure 13.
Figure 15:
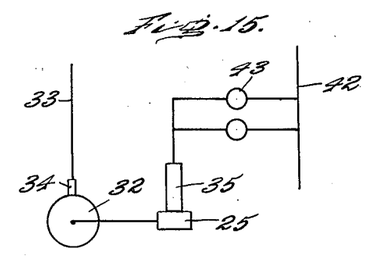
Figure 15 is an electric circuit illustrating the lighting for a particular traffic light color and direction.

Figure 13 illustrates one of the synchronous motors 22 which drives a gear reduction 23 which turns a switching drum 24 having contact paths 25, 26, 27, 28, 30 and 31, each of which has as shown in Figure 14 a succession of contacts 25' and interposed insulated portions 25². All of the contacts 25' of all of the paths 25 to 31 are connected to slip ring 32 which receives power from one side of an electric lighting power source 33 through brush 34. Each of the contact paths is connected by one of the brushes 35, 36, 37, 38, 40 and 41 to the desired traffic lights 43 which at the other side are connected to the opposite side 42 of the electric lighting power source.

Each of the contact paths is so arranged as to contact length 25', length of insulation 25² between contacts, and number of contacts and insulated areas so that it makes contact when particular lights are to be on during the cycle and does not make contact when those lights are to be off during the cycle.

Thus the desired distribution of the paths in a particular example may be as follows: green north, south is indicated by path 35; yellow north, south is indicated by path 36; red north, south is indicated by path 37; green east, west is indicated by path 38; yellow east, west is indicated by path 40, and red east, west is indicated by path 41. The prior examples will indicate the number of seconds of duration of each one of the appropriate lights at the appropriate intersection in a particular example. It will, of course, be obvious that the number of traffic lights 43 which are illuminated by a particular brush 35 to 41 will depend upon the number of traffic light standards used (whether the standards are at the corners, or in the center, or placed on various lanes).

It will be understood, of course, that the positions of the individual contacts will be adjusted according to the requirements of each intersection, as by replacing contact slugs of different sizes for contacts 25'.

Where it is desired, a succession of timers can be used, for example, as manufactured by Automatic Temperature Control Corporation, which time out and start a succeeding timer, while maintaining a light circuit closed, and are infinitely adjustable within a desired range such as one second to five minutes for each timer. In this case it is merely necessary to place a series of these timers in succession each to start the timer which lights the next light for the next interval.

In view of my invention and disclosure variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claim.

Having thus described my invention, what I claim as new and desire to secure by Letters Patent is:

In a traffic control system for a two-way street having a plurality of spaced intersections and having traffic flowing continually in both directions to produce progressive traffic zones in both directions on the same street, stop and go traffic signal lights at each of said intersections, means at each intersection for controlling the periods of stop and go for a number of successive stop and go cycles, said means varying the length of the immediately succeeding stop and go cycles and the ratio of stop and go periods for successive stop and go cycles, a plurality of said stop and go cycles forming a main cycle which is repetitive in the manner set forth, and means for operating said controlling means at each intersection synchronously in predetermined phase relation with the remainder of the controlling means at the other intersections on the same street.

References Cited in the file of this patent
UNITED STATES PATENTS

| | | |
|---|---|---|
| 2,542,978 | Barker | Feb. 27, 1951 |
| 2,577,296 | Alles | Dec. 4, 1951 |